United States Patent

Searle et al.

[11] Patent Number: 5,781,367
[45] Date of Patent: Jul. 14, 1998

[54] LIBRARY FOR STORING DATA-STORAGE MEDIA

[75] Inventors: Nathan H. Searle, Snohomish; Allen E. Fleckenstein, Bellevue, both of Wash.

[73] Assignee: Advanced Digital Information Corporation, Redmond, Wash.

[21] Appl. No.: 561,076

[22] Filed: Nov. 13, 1995

[51] Int. Cl.⁶ .................................................. G11B 15/68
[52] U.S. Cl. ............................ 360/92; 369/36; 369/178
[58] Field of Search .......................... 360/92; 369/36, 369/178, 191

[56] References Cited

U.S. PATENT DOCUMENTS

| | | | |
|---|---|---|---|
| 3,809,263 | 5/1974 | Dodd et al. | 214/16.4 R |
| 3,831,197 | 8/1974 | Beach et al. | 360/71 |
| 4,519,522 | 5/1985 | McElwee | 221/13 |
| 4,654,727 | 3/1987 | Blum et al. | 360/71 |
| 4,779,151 | 10/1988 | Lind et al. | 360/92 |
| 4,802,035 | 1/1989 | Ohtsuka | 360/92 |
| 4,816,943 | 3/1989 | Tanaka et al. | 360/92 |
| 4,817,070 | 3/1989 | Hug et al. | 369/36 |
| 4,864,511 | 9/1989 | Moy et al. | 364/478 |
| 4,945,429 | 7/1990 | Munro et al. | 360/92 |
| 4,984,106 | 1/1991 | Herger et al. | 360/92 |
| 5,016,127 | 5/1991 | Inoue et al. | 360/92 X |
| 5,089,920 | 2/1992 | Bryer et al. | 360/92 |
| 5,157,564 | 10/1992 | Theabold et al. | 360/92 |
| 5,182,687 | 1/1993 | Campbell et al. | 360/92 |
| 5,235,474 | 8/1993 | Searle | 360/71 |
| 5,258,882 | 11/1993 | Apple et al. | 360/92 |
| 5,291,110 | 3/1994 | Andrews, Jr. et al. | 318/560 |
| 5,481,514 | 1/1996 | Yamasaki et al. | 369/36 |

FOREIGN PATENT DOCUMENTS

| | | | |
|---|---|---|---|
| 0 186 945 | 5/1986 | European Pat. Off. | |
| 0 392 620 | 10/1990 | European Pat. Off. | 360/92 |
| 3612531 | 11/1986 | Germany | 360/92 |
| 61-92467 | 5/1986 | Japan | 360/92 |
| 62-239370 | 10/1987 | Japan | 360/92 |
| 62-239372 | 10/1987 | Japan | 360/92 |
| 62-239460 | 10/1987 | Japan | 360/92 |
| 63-244440 | 10/1988 | Japan | |
| 2-42672 | 2/1990 | Japan | 360/92 |
| 3-44858 | 2/1991 | Japan | 360/92 |
| 3-91153 | 4/1991 | Japan | 360/92 |
| 4-10264 | 1/1992 | Japan | 360/92 |
| 4-163761 | 6/1992 | Japan | 360/92 |
| 5-144144 | 6/1993 | Japan | 360/92 |

*Primary Examiner*—Stuart S. Levy
*Assistant Examiner*—William J. Klimowicz
*Attorney, Agent, or Firm*—Seed and Berry LLP

[57] ABSTRACT

A library for storing a cartridge of data-storage media includes a chassis having a plurality of walls that each have inner and outer sides. A cartridge storage receptacle is mounted to the inner side of a first of the walls and has a receptacle port facing away from the first wall. A cartridge mailbox is mounted within an port that is formed in a second of the walls. The mailbox has a slot with a first slot port accessible from the inner side of the second wall and a second slot port accessible from the outer side of the second wall. The slot is constructed to allow insertion of the cartridge into the slot via the first and the second slot ports, and to allow removal of the cartridge from the slot via the first and the second slot ports. An x-y drive assembly is mounted within the chassis. A cartridge picker is mounted to the drive assembly and has a first picker port and a second picker port. The picker is operable to receive the cartridge from and provide the cartridge to the mailbox slot via the first slot port and the first picker port. The picker can also receive the cartridge from and provide the cartridge to the storage receptacle via the receptacle port and the second picker port.

17 Claims, 8 Drawing Sheets

LIBRARY FOR STORING DATA-STORAGE MEDIA

TECHNICAL FIELD

The present invention relates generally to information storage devices and more specifically to a library for storing data-storage media cartridges, a device and a method for transporting such cartridges within the library, and a method for taking inventory of the cartridges stored within the library.

BACKGROUND OF THE INVENTION

Today, it is often desirable to store computer data in off-line locations where the data is easily and quickly retrievable. "Off-line" refers to locations other than a computer's on-line memory locations, i.e., internal memory, hard drives, and networked file servers. Within the past several years, computer users have phased in personal computers and workstations to perform tasks that main frame computers had previously performed. Even when networked with file servers, the on-line data storage capacity of personal computers and workstations is significantly less than that of main frame computers. Therefore, unlike the main-frame back-up and archival data that is typically stored off-line for an indefinite period of time, data for use with personal computers and workstations is often stored off-line with the intent that it be accessed or updated frequently.

Devices exist for storing data off-line and for allowing relatively quick and easy retrieval of the stored data. For example, U.S. Pat. No. 5,235,474 to Searle, which issued on Aug. 10, 1993 and is incorporated by reference for all purposes, discloses a device for storing digital-audio-tape (DAT) cassettes that contain computer data. The device includes a tape drive for reading and writing data from and to a desired cassette, and gripper arms for automatically transferring the desired cassette between the tape drive and a slot in a cassette storage magazine.

One problem with such devices, however, is that they can often require a relatively large volume to accommodate their media storage locations and media drives. Furthermore, such devices typically cannot automatically account for an operator manually moving a storage media from its assigned storage location. Additionally, such devices often cannot store digital-linear-tape (DLT) cartridges, which are currently widely used to store data off-line. Another problem with such devices is that the transport mechanisms used to transfer the storage media within the devices are often relatively slow, of very complex construction, and require a relatively large amount of operating space.

SUMMARY OF THE INVENTION

In accordance with one aspect of the present invention, a library for storing a cartridge of data-storage media, is provided. The library includes a chassis having a plurality of walls that each have inner and outer sides. A cartridge storage receptacle is mounted to the inner side of a first of the walls and has a receptacle port facing away from the first wall. A cartridge mailbox is mounted within an opening that is formed in a second of the walls. The mailbox has a slot with a first slot port accessible from the inner side of the second wall and a second slot port accessible from the outer side of the second wall. The slot is constructed to allow insertion of the cartridge into the slot via the first and the second slot ports, and to allow removal of the cartridge from the slot via the first and the second slot ports. An x-y drive assembly is mounted within the chassis. A cartridge picker is mounted to the drive assembly and has a first picker port and a second picker port. The picker is operable to receive the cartridge from and provide the cartridge to the mailbox slot via the first slot port and the first picker port. The picker can also receive the cartridge from and provide the cartridge to the storage receptacle via the receptacle port and the second picker port.

In accordance with another aspect of the invention, a picker is provided for transporting a media cartridge within a cartridge library having a media mailbox and having a media storage cell spaced apart from the mailbox. The picker includes a frame assembly that has a first cartridge port that faces the mailbox and a second cartridge port that faces the storage cell. A carriage assembly is mounted to the frame and forms a cartridge passageway between the first and the second cartridge ports. A jaw assembly is mounted to the carriage assembly and can grasp the cartridge. The carriage assembly moves the jaw assembly between the first and second cartridge ports. A transport assembly is mounted to the frame and moves the cartridge along the cartridge passageway between the first and second cartridge ports.

Advantages provided by various aspects of the invention include an increase in the number of media storage and media drive locations, an automatic inventory to account for the manual reorganization of the stored media, and the capability to store DLT cartridges. Advantages provided by another aspect of the invention include a transport mechanism that is relatively fast, that has a less complex construction, and that requires less operation space as compared with existing transport mechanisms.

DETAILED DESCRIPTION OF THE INVENTION

Figure 1:
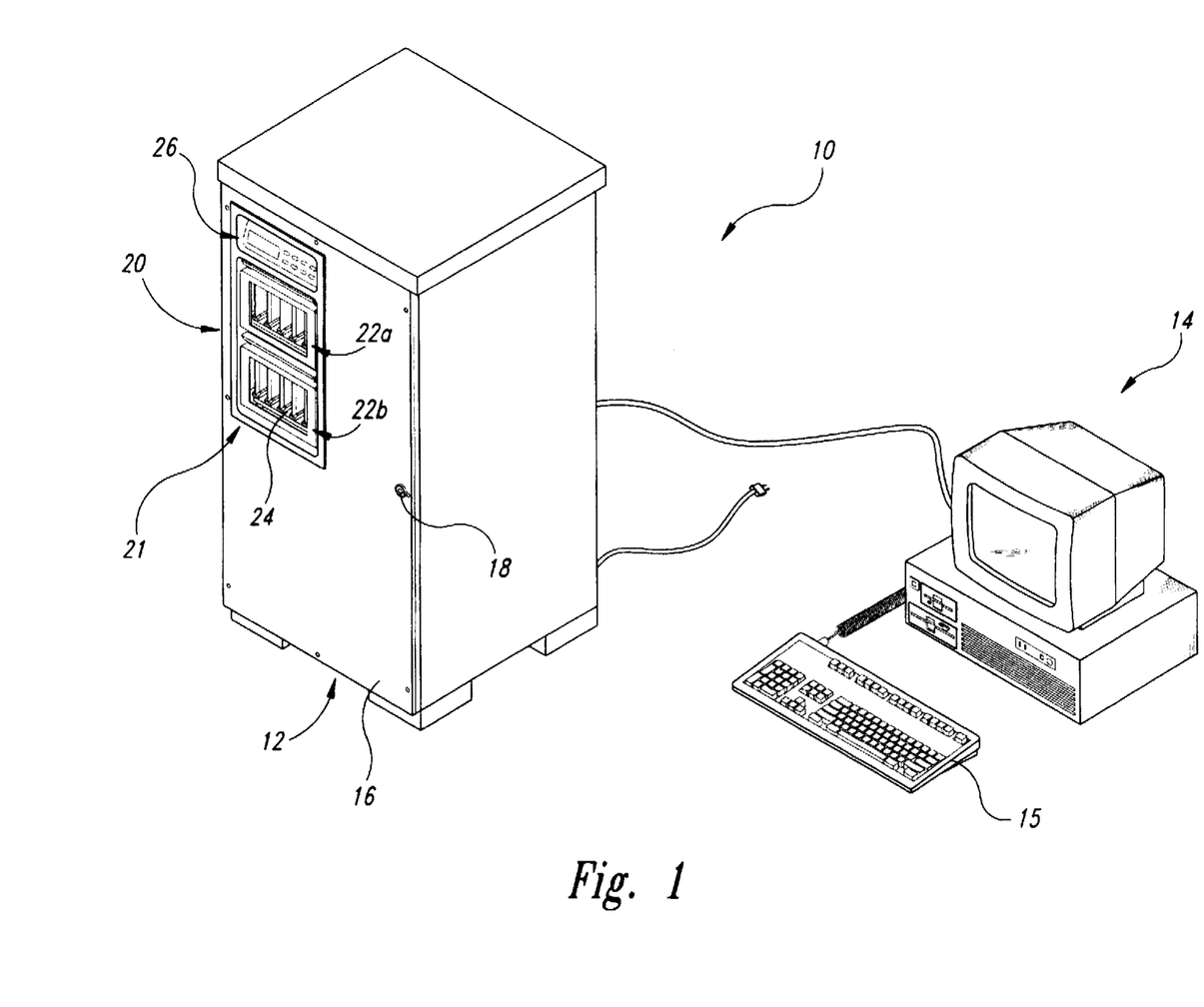
FIG. 1 shows a data library system according to the present invention.

A data-media storage system 10 in accordance with the present invention is illustrated in FIG. 1. The storage system 10 includes a library 12 for storing data-storage media such as DLT cartridges. A conventional host computer 14, such as a personal computer, is coupled to and controls the operation of the library 12 via a conventional master processing circuit (not shown) and one or more conventional slave processing circuits (not shown) that are included within the library 12. A keyboard 15 is provided to provide operator input to the computer 14. The library 12 includes a main door 16 that allows an operator (not shown) access to the interior of the library 12. The main door 16 has mounted therein a conventional lock 18 to prevent unauthorized access to the library 12, and may be transparent to allow the operator to view the interior of the library 12. A mailbox 20 is mounted within an opening 21 formed in the door 16, and includes two rows or magazines 22, each having a plurality of mailbox slots 24. Each mailbox slot 24 is constructed to receive a media cartridge (not shown in FIG. 1). Although the mailbox slots 24 are shown constructed to receive DLT cartridges, the slots 24 may be constructed to receive other types of data-storage media such as DAT cassettes, floppy disks, compact-disk read-only memory (CD-ROM), and tape cassettes. Furthermore, although the magazines 22 are shown as vertically stacked upper and lower magazines 22a and 22b, respectively, the mailbox 20 may include more or fewer magazines 22 mounted within different portions of the door 16. A conventional control panel 26, which is also mounted within the opening 21, displays a menu of and allows the operator to select and run diagnostic software routines for the library 12. The operator may also select and run the diagnostic routines from the host computer 14.

In operation, the operator typically imports data-media cartridges into and exports cartridges from the library 12 via the mailbox slots 24. The operator also can import and export cartridges into and from the library 12 by opening the door 16 and directly inserting or removing cartridges from the library 12. The host computer 14 may access and update the data stored on the cartridges while within the library 12, or the cartridges may be stored in the library 12 for use with another computer (not shown). Thus, library 12 provides an off-line storage location that allows media cartridges to be easily and quickly stored and retrieved.

Figure 2:
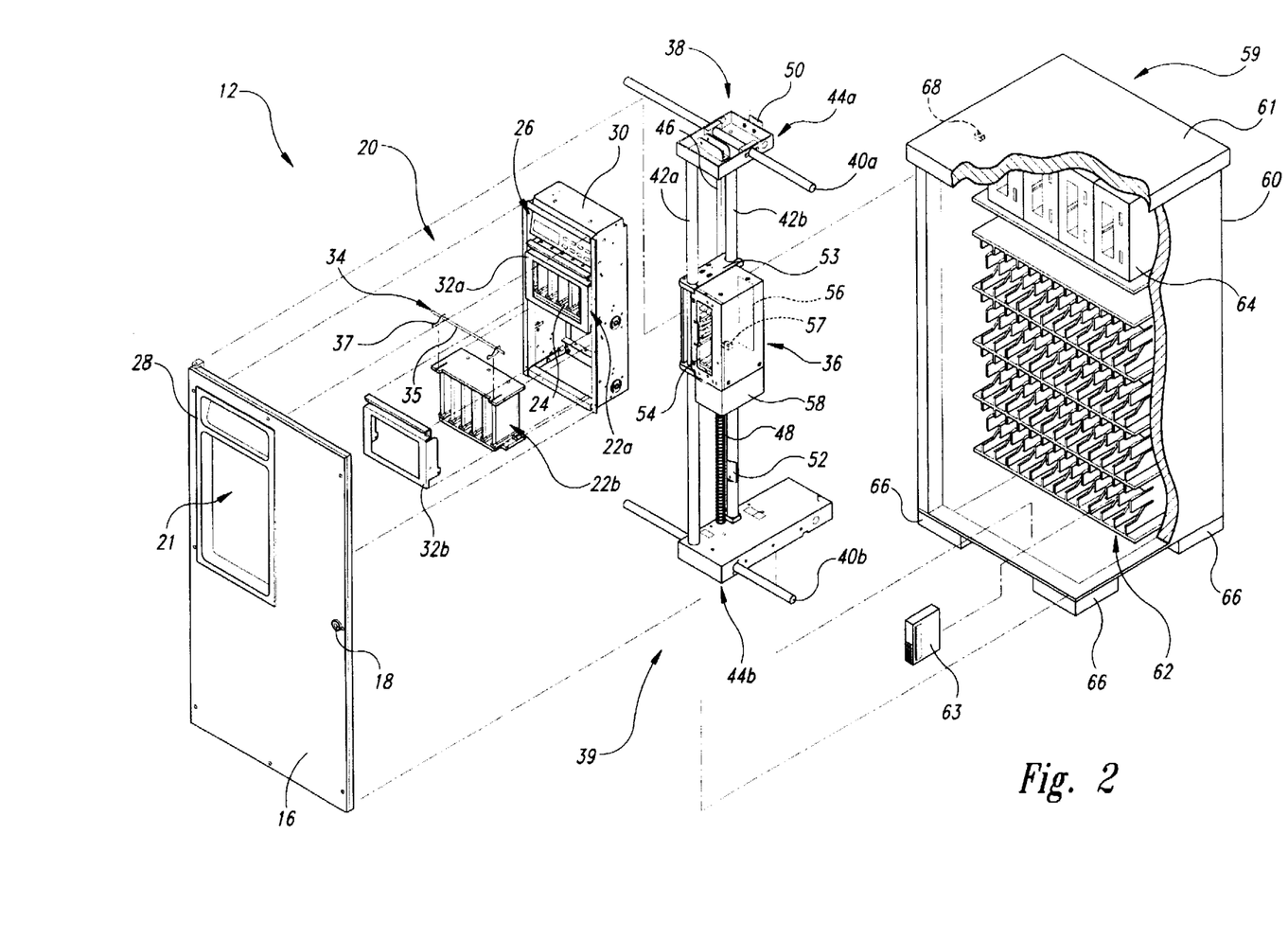
FIG. 2 is an exploded isometric view of the data library system of FIG. 1.

The library 12 of FIG. 1 is shown in an exploded view in FIG. 2. As shown, a mailbox molding 28 is mounted within the opening 21 of the main door 16. In addition to the upper and lower magazines 22a and 22b and the control panel 26, the mailbox 20 also includes a mailbox housing 30, two mailbox doors 32, and for each mailbox door, a mailbox latch assembly 34, which includes a latch cam 35 and latches 37. An upper mailbox door 32a closes the upper magazine 22a, and a lower mailbox door 32b closes the lower magazine 22b. The mailbox slots 24 each include an exterior slot opening that opens to the exterior of the library 12 toward the operator, and thus when the door 16 is closed, and an interior slot opening that opens to the interior of the library 12 when the door 16 is closed. In another embodiment of the invention not illustrated, the door 16 is replaced with a wall in which the mailbox 20 is mounted. When the door 16 is closed, the mailbox 20 lies substantially in a plane, and the slots 24 are constructed to hold cartridges 61 in an orientation that is substantially perpendicular to this plane.

A cartridge picker 36 is mounted to a conventional two-dimensional, i.e., x-y drive assembly 38, which together form a cartridge transfer assembly 39. The x-y assembly 38 lies and moves the picker 36 in a plane that is substantially parallel to the plane in which the mailbox 20 lies. The x-y drive assembly 38 includes upper and lower horizontal bearing shafts 40a and 40b, respectively, vertical bearing shafts 42a and 42b, horizontal linear bearing assemblies 44a and 44b, and a coil guide rod 46. A cable 48, which in one aspect of the invention is similar to a coiled telephone cord, is coiled around the coil guide rod 46 and electrically couples the picker 36 to associated control circuitry (not shown). As shown, an x-position flag 50 is mounted to the bearing assembly 44a, and a y-position flag 52 is mounted to the bearing shaft 42b. A linear bearing 53 is coupled to the shafts 42a and 42b. The x-y assembly 38 also includes conventional drive motors, drive belts, and other components that have been omitted for clarity.

The picker 36 is mounted to the bearing 53 for travel therewith, and includes an outward facing, first mailbox port 54 and an inward facing, second storage-cell port 56, which is shown in phantom line in FIG. 2. The picker 36 is constructed to pass through cartridges 61 in a direction substantially perpendicular to the plane in which the x-y assembly 38 moves the picker 36. The picker 36 has mounted therein an optical y-position sensor 57, which is also shown in phantom line. A bar-code reader assembly 58, which reads bar-code identification labels on the DLT cartridges 63 (one of which is shown in FIG. 2), is mounted to the bottom of the picker 36. In the illustrated embodiment of the invention, the bar-code reader assembly 58 is a model number OS2000 bar-code reader manufactured by ScanQuest.

The library 12 also includes a chassis 59, which is a five sided enclosure, with an open front side at which the door 16 is pivotally mounted. Mounted to an interior side of a rear wall 60 of the chassis 59 are a number of storage receptacles or cells 62, which are arranged in rows and lie in a plane substantially parallel to those in which the mailbox 20 and x-y assembly 38 lie. Each cell 62 has a cell opening that opens to the interior of the library 12, i.e., in a direction substantially perpendicular to the plane in which the cells 62 are arranged, and is constructed to hold one DLT cartridge 63. Although shown constructed to hold DLT cartridges 63, the cells 62 may be constructed to hold other types of data-storage media as discussed above. Also mounted to the rear wall 60 are a number of media drives 64 for reading from and writing to media cartridges 63 that are stored within the library 12. In one embodiment of the invention, the media drives 64 are selected from one or more of model numbers DLT-2000, DLT-2000XT, or DLT-4000, which are manufactured by Quantum. As shown, the chassis 59 includes four media drives 64 and forty eight storage cells 62. However, other contemplated embodiments of the invention may include two media drives 64 and twenty four storage cells 62, or eight drives 64 and thirty six storage cells 62. A number of legs 66 support the chassis 59. An x-position sensor 68, which is shown in phantom, is mounted to an upper wall or roof 61 of the chassis 59.

As stated above, the library 12 also includes conventional master control and communication circuitry (not shown) that is mounted to the rear wall 60 of the chassis 59, and conventional slave circuitry (not shown) that is mounted at various places within the library 12. Such circuitry may include one or more processors (not shown). The cable 48 couples such slave circuitry in the picker 36 to the master control circuitry via another communications cable (not shown). In operation, the computer 14 typically provides high-level instructions to the master control circuitry, which provides mid-level instructions to the appropriate slave circuitry. The slave circuitry then controls the operation of the various electrical and electromechanical components of the library 12. For example, the computer 14 may instruct the master control circuitry to transfer all the cartridges 63 that are in the mailbox 20 to the storage cells 62. The master control circuit then instructs the appropriate slave circuits to remove cartridges 63 in specific slots 24, and to load them into specific cells 62. The slave circuitry then appropriately activates and deactivates the motors and sensors of both the x-y drive assembly 38 and the picker 36 to carry out this transfer operation. For clarity hereinafter, the term "control circuitry" will be used generically to indicate that the appropriate combination of the computer 14, the master control circuitry, and the slave circuitry has been used to control the indicated components to perform the indicated functions.

In operation, to import media cartridges 63 into the library 12, the operator opens the mailbox door 32 adjacent to the desired mailbox magazine 22 and inserts the cartridges 63 into the slots 24 of the exposed mailbox magazine. In one aspect of the invention, the upper mailbox magazines 22a is dedicated to importing cartridges 63 into the library 12, and the lower magazine 22b is dedicated to exporting cartridges 63 from the library 12. Via the host computer 14 (FIG. 1), however, the operator may program library 12 to allow any of the slots 24 to either or both import or export the cartridges 63. After the operator has loaded the cartridges 63 into the mailbox slots 24, he closes the mailbox doors 32 and informs the computer 14, typically via an input device such as the keyboard 15, that it may proceed with the importing procedure. The control circuitry then positions via solenoids (not shown in FIG. 2) the mailbox latch assembly 34 for each of the doors 32 in a locked position, such that the latch assembly 34 prevents the operator from opening the mailbox doors 32 and accessing the mailbox slots 24. In one aspect of the invention, when a transfer of a cartridge 63 to or from a mailbox slot 24 is requested, the control circuitry operates the x-y drive assembly 38 only when the mailbox doors 32 are closed and locked. However, during, e.g. a cartridge transfer between a drive 64 and a cell 62, the doors 32 need not be closed or locked for the x-y assembly 38 to operate.

Next, the control circuitry instructs the x-y drive assembly 38 to move the picker 36 such that the mailbox port 54 of the picker 36 is aligned with the mailbox slot 24 that contains a first cartridge 63 to be stored. The picker 36 then moves the cartridge 63 from the mailbox slot 24 and into the picker 36 through the mailbox port 54. Once the cartridge 63 is fully within the picker 36, the control circuitry instructs the x-y assembly 38 to move the picker 36 such that the storage-cell port 56 of the picker 36 is aligned with the desired storage cell 62. When the storage-cell port 56 is so aligned, the picker 36 moves the cartridge 63 from the picker 36 through the storage-cell port 56 into the desired storage cell 62.

To export the media cartridges 63 from the library 12, the above-described importing procedure is substantially performed in reverse, with the picker 36 unloading the cartridge 63 from the storage slot 62 via the storage-cell port 56 and loading the cartridge 63 into the mailbox slot 24 via the mailbox port 54.

In similar fashion, the control circuitry can control the x-y drive 38 and the picker 36 to transport cartridges 63 between a desired storage cell 62 and a desired media drive 64, between a desired media drive 64 and a desired mailbox slot 24, between two mailbox slots 24, between two storage cells 62, and between two media drives 64. In cases where the cartridge origination and destination are on the same side of the cartridge picker 36 (e.g., between a media drive 64 and a storage cell 62), both the loading and the unloading are done through only one of the picker ports 54 or 56.

The library 12 requires less volume to store a comparable number of cartridges 63 than many known storage devices. For example, some known storage devices have a cartridge transfer assembly that moves in three dimensions, and thus require a relatively large space between the storage receptacles and library entry point to accommodate this three-dimensional movement. In contrast, the x-y assembly 38 of the library 12 moves the picker 36 only in a plane that is between and substantially parallel to the planes containing the mailbox 20 and the cells 62, and the picker 36 passes through a selected cartridge 63 between the mailbox 20 and the cells 62 in a direction, i.e., the z direction, that is substantially perpendicular to this plane of movement. Thus, because the picker 36 moves in substantially only the x-y plane, and, without moving in the z plane, passes through a selected cartridge 63 in the z plane, the mailbox 20 and the cells 62 can be located closer together than in many known storage devices.

Still referring to FIG. 2 and further discussing the operation of the library 12, at the beginning of each transfer cycle, i.e., typically after the main door 16 or the mailbox doors 32 have been opened and then closed, the control circuitry performs an initial positioning of the picker 36 such that the control circuitry can reference all subsequent movements of the picker 36 to a known start position. The control circuitry recognizes an x-dimension home position of the picker 36 as the position where the x-position sensor 68 detects the x-position flag 50, and a y-dimension home position of the picker as the position where the y-position sensor 57 detects the y-position flag 52. When the picker 36 is in an x-y home position, the picker will be detected by both the x-position sensor 68 and the y-position sensor 57. By using a known technique of measuring with an optical tachometer mechanism (not shown) the rotation distance of x-y drive stepping motors used to move the picker 36, the control circuitry can determine the current position of the picker 36 with reference to its last known position. Furthermore, after it brings the picker 36 to its x-y home position, but before it instructs the picker 36 to begin transferring cartridges, the control circuitry instructs the bar-code reader assembly 58 (and moves the picker 36 accordingly) to read the bar codes of cartridges 63 that are in the storage cells 62. Thus, the control circuitry makes an inventory of the cartridges within the library 12 and their locations therein. By homing the picker 36 and taking an inventory at the beginning of each cartridge-transfer cycle, the control circuitry can automatically account for any operator or other manual removal or insertion of cartridges or movements of the picker 36 within the library 12.

Figure 3:
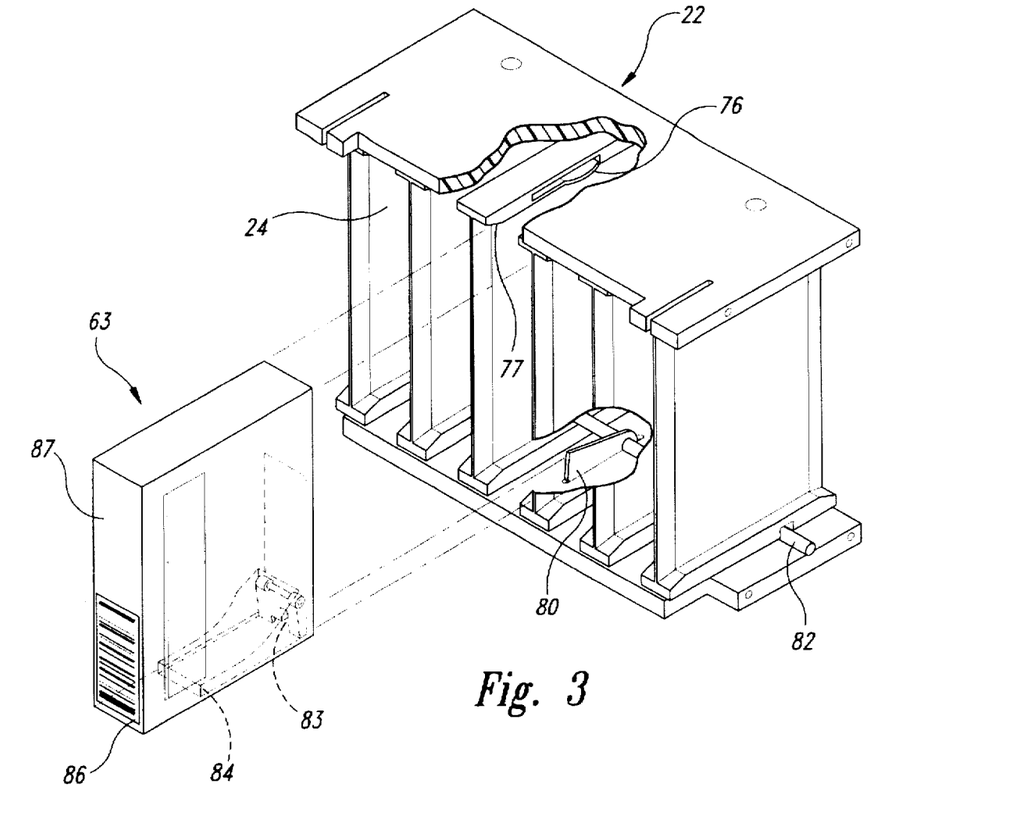
FIG. 3 is an enlarged, exploded isometric view from the left side, with portions broken away of a mailbox magazine of FIG. 2 and a storage-media cartridge.

FIG. 3 is an exploded isometric view of one of the mailbox magazines 22 from FIG. 2, and a DLT cartridge 63. Each of the mailbox slots 24 of the mailbox magazine 22 includes a spring-type holding clip 76, which is formed along a top abutment 77 of the mailbox slot 24, to retain the cartridge 63 within the slot 24. Each mailbox slot 24 also includes a check lever 80 attached to a check-lever rod 82 extending the length of the magazine 22. The check lever 80 protrudes through the bottom of the slot 24. The check lever 80 ensures that the cartridge 63 can only be inserted into a slot 24 in one proper orientation, i e., when a notch 83 in the cartridge 63 is aligned with the check lever 80. By abutting against a rear stop 84 of the cartridge 63, the check lever 80 prevents the operator from inserting the cartridge 63 too far into the slot 24. In addition to the notch 83 and the stop 84, the cartridge 63 also includes a bar-code label 86, which is located on a rear wall 87 of the cartridge 63 and encodes cartridge identification data that is unique to the particular cartridge 63 to which it is affixed. The label 86 may be imprinted directly on the rear wall 87, or may be printed on a paper label that is affixed to the rear wall 87. Also, data encoding other than a bar code may be used to encode such identification data.

During operation of the library 12, when the mailbox doors 32 (FIG. 2) are open or unlocked, the check levers 80 are in the position as described above to ensure that the operator does not improperly insert the cartridges 63 into the slots 24. After the mailbox doors 32 have been closed, the control circuitry locks the mailbox doors 32 and, via solenoids (not shown), rotates the check-lever rod 82 such that all of the check levers 80 move downward and out of the slots 24 a sufficient distance to allow the picker 36 to remove the cartridges 63 from the interior slot openings at the rear of the slots 24. The check-lever rod 82 is spring-loaded in a conventional manner so as to allow the picker 36 to load a cartridge 63 into the interior opening of a slot 24 regardless of the position of the check levers 80 and the check-lever rod 82. That is, the check levers 80 and the check-lever rod 82 are constructed so that a cartridge 63 can be loaded into the interior opening of a mailbox slot 24 even when the check-lever 80 in that slot 24 is in a position to prevent the loading of a cartridge 63 from the exterior opening of the slot 24. Thus, the check levers 80 never prohibit the loading of the slots 24 via their interior openings.

Figure 4:
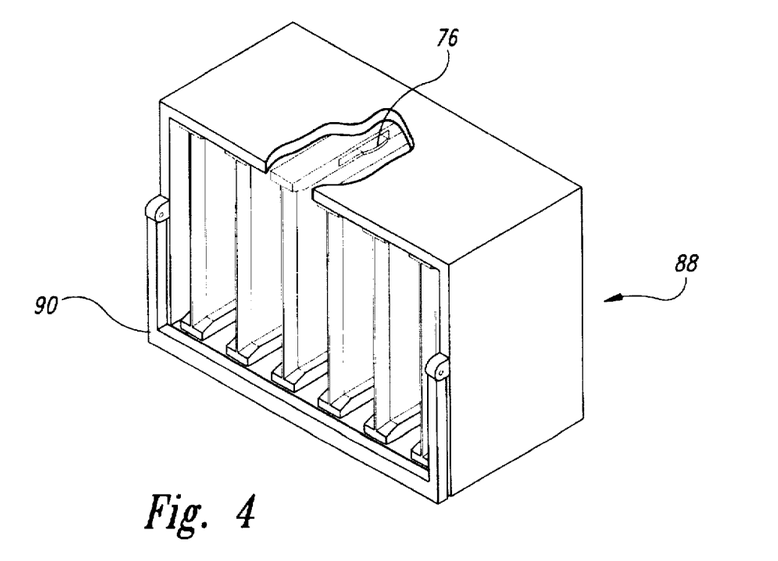
FIG. 4 is an alternate embodiment of the mailbox magazine of FIG. 3.

FIG. 4 is a perspective view of a removable mailbox magazine 88, which may be used as an alternative to the mailbox magazine 22 of FIG. 3 (which is permanently mounted within the mailbox housing 30). As shown, the removable mailbox magazine 88 includes the spring clips 76, and notches (not shown) to receive the check levers 80 of FIG. 3, which along with the check-lever rod 82, remain with the mailbox 20 when the magazine 88 is removed from the mailbox housing 30. A handle 90 is pivotally coupled to the front of the magazine 88, and facilitates the removing and the carrying of the magazine 88.

Figure 5A:
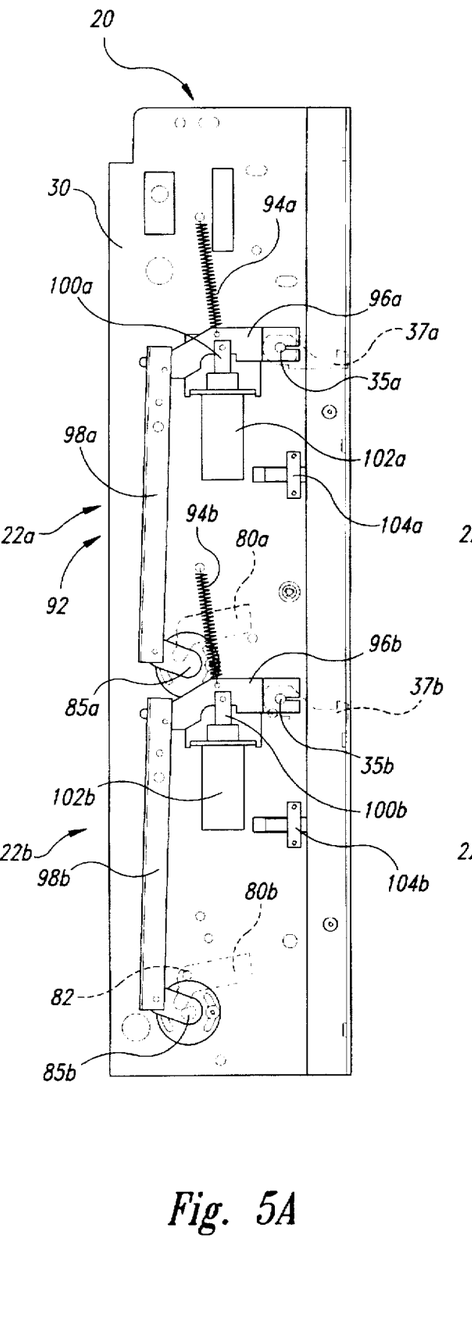
FIG. 5A is an enlarged, right side view of the mailbox of FIG. 2 in an unlocked condition.
Figure 5B:
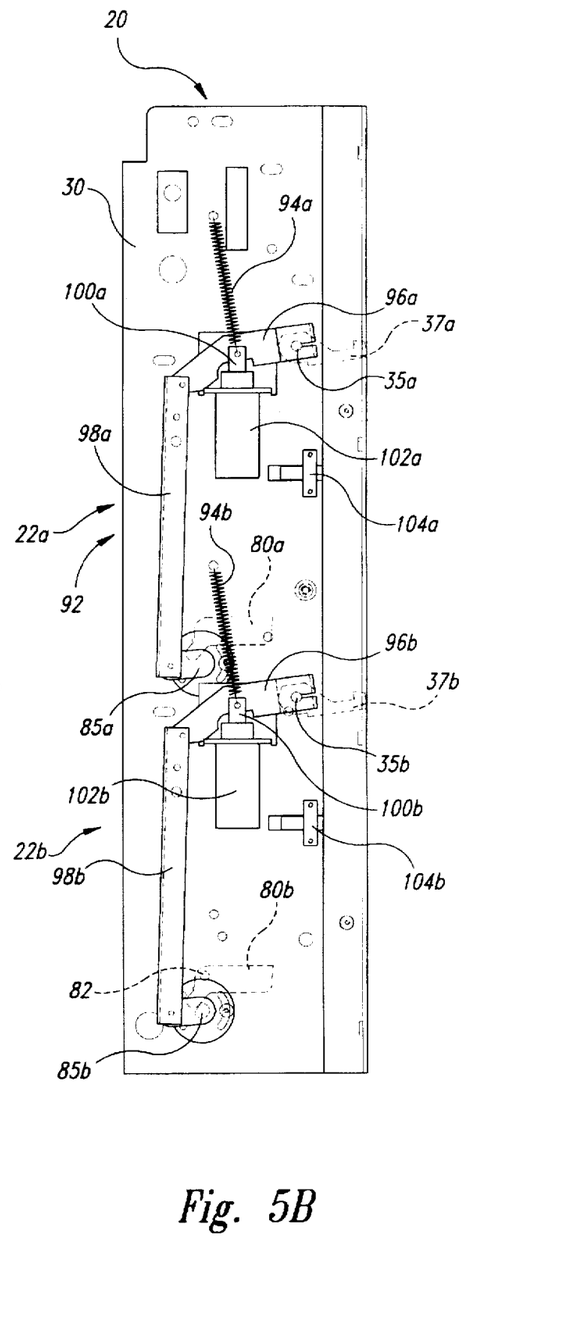
FIG. 5B is an enlarged, right side view of the mailbox of FIG. 2 in a locked condition.

FIGS. 5A and 5B show side views of the mailbox 20 removed from the door 16. FIG. 5A shows a locking and check lever assembly 92 in an unlocked position, and FIG. 5B shows the assembly 92 in a locked position. The assembly 92 includes a pair of tension springs 94a and 94b that are coupled between the mailbox housing 30 and a respective solenoid linkage member 96a and 96b, which are respectively coupled to check-lever cams 85a and 85b via links 98a and 98b, respectively. Each of the check-lever cams 85a and 85b is attached to one of the check-lever rods 82 for the corresponding mailbox magazine 22. In FIGS. 5A and 5B the check levers 80 for the upper and lower mailbox magazines 22a and 22b are designated with reference numerals 80a and 80b, respectively, and shown in phantom line. The linkage members 96a and 96b also have ends spaced away from their point of connection to the links 98a and 98b, that are respectively coupled to mailbox latch cams 35a and 35b which rotate latches 37a and 37b (shown in phantom). The center portions of the linkage members 96a and 96b are respectively coupled to plungers 100a and 100b of respective linear-pull solenoids 102a and 102b, which are mounted to the mailbox housing 30. The mailbox 20 also includes optical mailbox door sensors 104a and 104b, although other types of sensors, such as magnetic, may be used. Each of the mailbox door sensors 104a and 104b is positioned adjacent a corresponding one of the upper and lower mailbox doors 32a and 32b to sense whether the doors are open.

In operation, the mailbox 20 starts out in the unlocked position, as shown in FIG. 5A, to allow the operator to open the mailbox doors 32 (FIG. 2) and insert one or more cartridges 63 (FIG. 3) into the desired mailbox slot or slots 24. Once the operator indicates to the host computer 14 (FIG. 1) that the cartridges 63 have been loaded into the slots 24, the control circuitry energizes the solenoids 102a and 102b to pull the linkage members 96a and 96b downward and lock the mailbox as shown in FIG. 5B by rotating the latches 37a and 37b upward (counterclockwise as viewed in FIGS. 5A and 5B). The sensors 104a and 104b indicate to the control circuitry the current condition of the mailbox doors 32. If the sensors 104 indicate that the mailbox doors 32 are open, the control circuitry signals the operator by conventional means and does not begin a cartridge transfer procedure until the sensors 104a and 104b indicate that operator has closed both of the mailbox doors 32. When it confirms via the sensors 104a and 104b that the operator has closed the mailbox doors 32, the control circuitry energizes the solenoids 102a and 102b. As they energize, the solenoids 102a and 102b retract the plungers 100a and 100b. The retraction of the plungers 100a and 100b causes the linkage members 96a and 96b to pivot such that the latches 37a and 37b move into a locked position and the check-lever rods 82 rotate the check levers 80a and 80b downward (counterclockwise as viewed in FIGS. 5A and 5B) and move them into a position that allows the picker 36 (FIG. 2) to unload the cartridges 63 from the rear of the mailbox slots 24.

Figure 6:
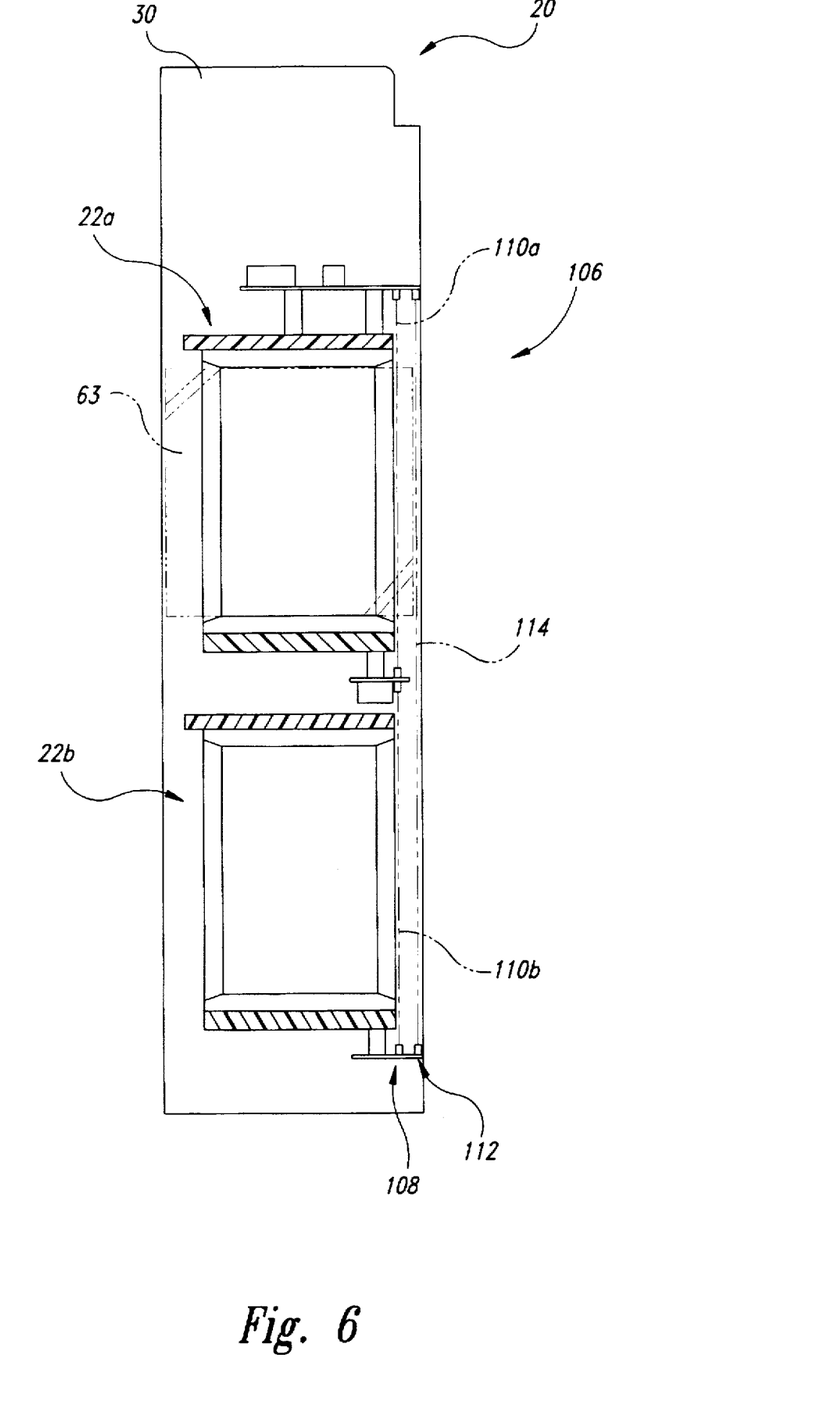
FIG. 6 is an enlarged, left side view of the mailbox of FIG. 2 showing a mailbox sensor array.

FIG. 6 is a cut-away side view of the mailbox 20 of FIG. 2, which shows an optical cartridge-sensor array 106. A first row of sensors 108 is positioned to generate light beams 110a and 110b across the interior openings of the slots 24 in the upper and lower magazines 22a and 22b, respectively. That is, there is one beam 110a across the interior opening of each slot 24 in the upper magazine 22a, and one beam 110b across the interior opening of each slot 24 in the lower magazine 22b. The sensors 108 are positioned such that if one of the light beams 110a and 110b is broken, the control circuitry determines that a cartridge 63 is present in the particular mailbox slot 20 corresponding to one of the sensors 108 that generated the broken beam. A second row of sensors 112 located rearward of the sensors 108 generates light beams 114, which extends across the interior opening of vertically aligned slots 24 in both the upper and lower magazines 22a and 22b, and is spaced a distance away from and rearward of the beams 110a and 110b. The beams 114 are used to ensure that the picker 36 has inserted a cartridge 63 far enough into the appropriate mailbox slot 24. If the beam 114 is broken, a cartridge 63 is extending too far out from the interior opening of the slot 24 it is in. The control circuitry then deactivates the x-y drive assembly 38 and the picker 36, and the computer 14 notifies the operator that a cartridge 63 is improperly inserted in a slot of the mailbox 20. The operator then properly inserts the cartridge 63 into the mailbox slot 24 so that the library 12 can resume its operation. Although the sensor array 106 is described as generating light beams, other sensors that generate other energy beams, such as sonic energy beams, may be used.

Figure 7:
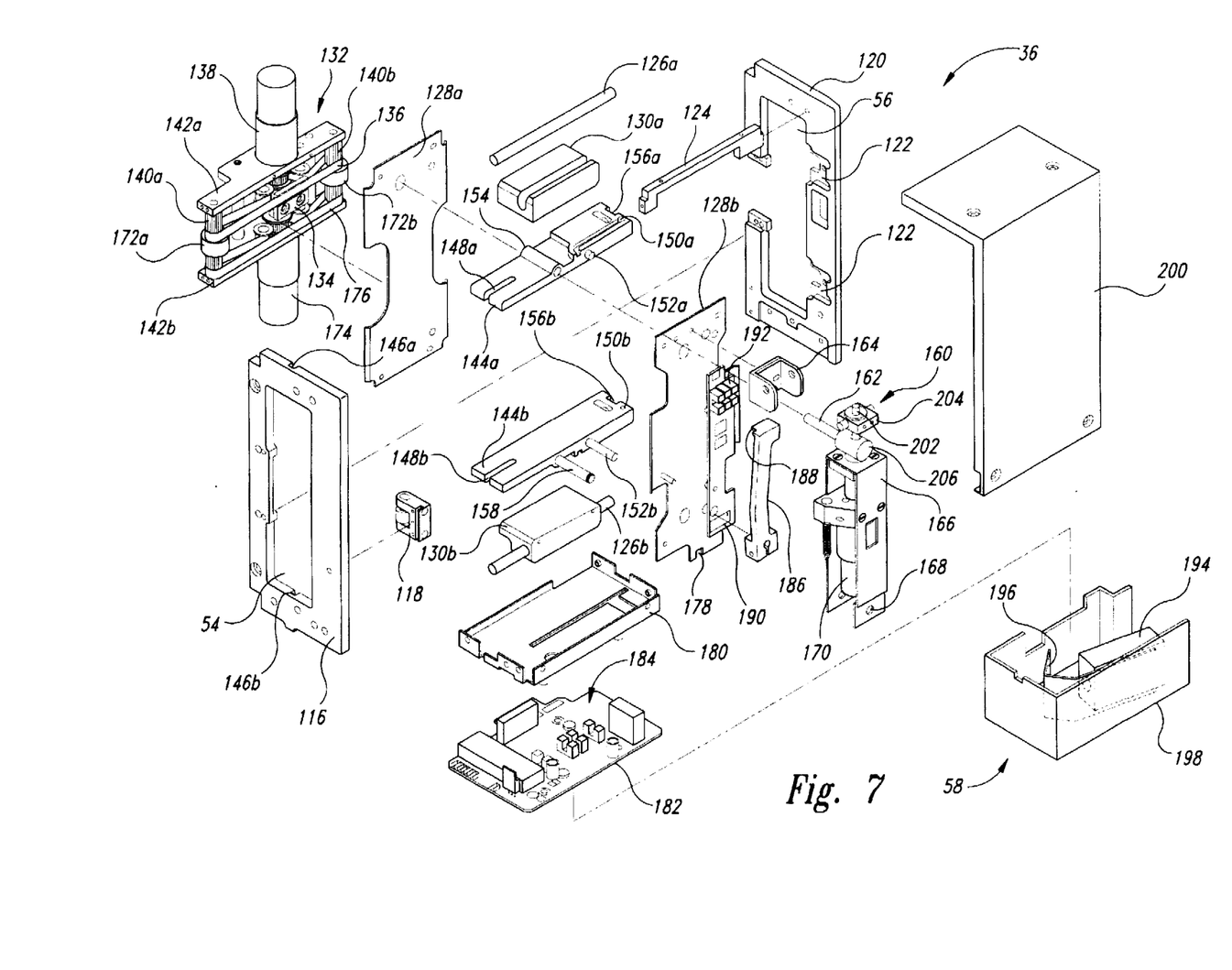
FIG. 7 is an enlarged, exploded isometric view of the cartridge picker assembly of FIG. 2.

FIG. 7 is an exploded isometric view of the picker 36 of FIG. 2. A frame assembly of the picker 36 includes a front frame plate 116 that faces the mailbox slots 24 when the main door 16 is in a closed position. As shown, the plate 116 defines the magazine port 54 of the picker 36, and includes sensor mounting notches 146a and 146b. A rear frame plate 120, which faces the storage cells 62, defines the storage cell port 56 of the picker 36. A frame brace 124 and linear bearing shafts 126a and 126b are coupled between plates 116 and 120.

A carriage assembly of the picker 36 is mounted to the frame assembly and includes a pair of cartridge guide plates 128a and 128b, which are coupled to opposite sides of linear bearings 130a and 130b. Bearings 130a and 130b are respectively coupled to the bearing shafts 126a and 126b of the frame assembly as shown, and together with the plates 128a and 128b, form a cartridge passageway. As shown, the guide plate 128b has a sensor flag 178. A carriage drive assembly 132. which is also part of the carriage assembly. includes a belt mount 134. which couples a carriage drive belt 136 to the cartridge guide plate 128a. A carriage drive motor 138 is coupled to the drive belt 136. which winds around idler pulleys 140a and 140b. The carriage drive assembly 132 is mounted to the plates 116 and 120 of the frame assembly via mounting brackets 142a and 142b.

A jaw assembly that is mounted to the carriage assembly of the picker 36 includes an upper jaw 144a and a lower jaw 144b. The upper jaw 144a includes a sensor-beam notch 148a, a sensor mounting hole 150a, a pivot rod 152a, a control cylinder 154. and a spring-loaded contact clip 156a. The lower jaw 144b includes a sensor-beam notch 148b, a sensor mounting hole 150b, a pivot rod 152b, a control rod 158, and a spring-loaded contact clip 156b. The jaws 144a and 144b are pivotally mounted to the guide plates 128a and 128b of the carriage assembly via the pivot rods 152a and 152b. As shown, a jaw sensor member 186 is coupled to the pivot rod 152b and has a sensor flag 188. Portions of the pivot rods 152a and 152b that extend from the opposite sides of the jaws 144a and 144b are omitted for clarity. A jaw drive assembly 160. which is part of the jaw assembly. is mounted to the guide plate 128b via a mounting bracket 164. The drive assembly 160 includes a control rod 162, which extends through the control cylinder 154 of the upper jaw 144a. The control rod 158 is coupled to the drive assembly 160 via holes 168, which are formed in a bracket 166. A jaw drive motor 170 is mounted to the bracket 166, and drives a threaded rod 202. which has a first portion threaded through a mount 204 and a second portion threaded through a bushing 206. The thread pitch of the first portion of the rod 202 is approximately two times the thread pitch of the second portion.

Still referring to FIG. 7. a cartridge transport assembly is mounted to the frame assembly and includes a pair of cartridge rollers 172a and 172b, which are rotated by a roller motor 174 via a roller belt 176. As shown, the brackets 142a and 142b mount the rollers 172a and 172b and the motor 174 to the front and rear frame plates 116 and 120. Four spring-loaded idle rollers 118 (only one of which is shown in FIG. 7 for clarity) are mounted in receptacles 122 of the plates 116 and 120.

A sensor assembly includes a first optical transmitter/receiver pair mounted in notches 146a and 146b of the front frame plate 116 to generate a first optical energy beam therebetween, and across the port 54 of the picker 36. A second optical transmitter/receiver pair is mounted in holes 150a and 150b of the upper and lower jaws 144a and 144b, respectively, to generate a second optical beam therebetween, and between the ends of the jaws 144a and 144b that are adjacent to the port 56 of the picker 36. A sensor circuit board 190, which is mounted to the guide plate 128b, includes a jaw-position optical sensor array 192. A circuit board 182 includes a carriage-position optical sensor array 184. The circuit board 182 is mounted to a circuit board mount 180, which is mounted to the frame assembly between the front and rear frame plates 116 and 120. In addition to the sensor array 184. the circuit board 182 includes slave control circuitry such as a processor for controlling the motors 138, 170, and 174. This slave control circuitry is electrically coupled to the master control circuitry via the cable 48 (FIG. 2).

The bar-code assembly 58 includes a bar-code scanner 194, a focal mirror 196 to adjust the focal length of the scanner 194, and a cover 198, which are mounted to the bottoms of the front and rear frame plates 116 and 120.

A picker cover 200, of which only one portion is shown for clarity. is coupled to the frame assembly via the front and rear frame plates 116 and 120 and shields the picker 36 from dust and other contaminants.

Figures 8A, 8B:
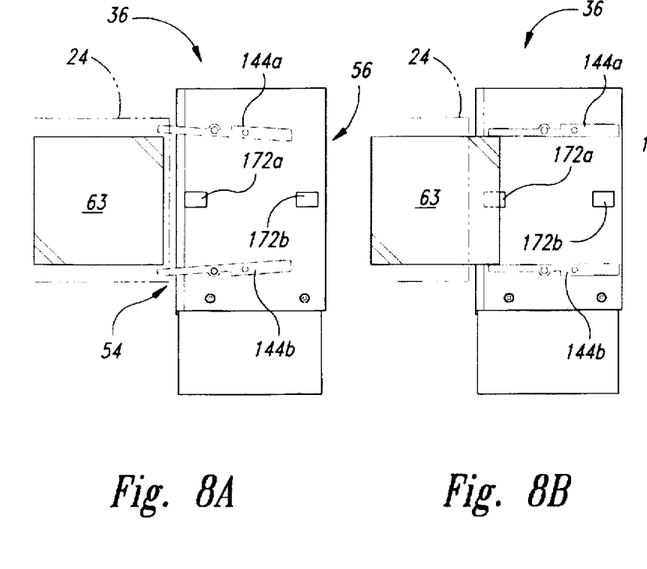
FIGS. 8A–8F illustrate a transfer of a cartridge from the mailbox to a storage cell of FIG. 2.

The operation of the picker 36 is illustrated in FIGS. 8A–8F during the transfer of a cartridge 63 from one of the mailbox slots 24 to one of the storage cells 62. The slot 24 and the cell 62 are represented by dashed lines. Referring to FIGS. 7 and 8A, the control circuitry positions the picker 36 in an x-y plane between the mailbox 20 and the storage cells 62 such that the mailbox port 54 of the picker 36 is aligned with the desired mailbox slot 24. Next, the control circuitry activates, via the slave circuitry on the board 182, the jaw drive assembly 160. The jaw motor 170 is rotated to force the bracket 166 and the bushing 206 apart from one another, thus expanding or opening the mouth of the jaws 144a and 144b that is adjacent to the port 54. The sensor array 192 and the sensor flag 188 provide the relative position of the jaws 144a and 144b to the control circuitry. The control circuitry deactivates the motor 170 when the jaws 144a and 144b are open the desired amount. Then, the control circuitry activates the carriage motor 138, which rotates to slide the carriage assembly along linear shafts 126a and 126b, and thus protrude the open jaws 144a and 144b out through the mailbox port 54 of the picker 36. The sensor array 184 and the sensor notch 178 operate to provide to the control circuitry the position of the carriage assembly relative to the frame assembly. When the carriage assembly has moved the desired distance such that the jaws 144a and 144b protrude from the port 54 and straddle the cartridge 63 as shown in FIG. 8A. the control circuitry deactivates the carriage motor 138.

Referring to FIGS. 7 and 8B, the control circuitry activates the jaw motor 170 to close the jaws 144a and 144b such that they grasp the cartridge 63. Again, using information provided by the sensor array 192, the control circuitry deactivates the motor 170 when the jaws 144a and 144b exert sufficient pressure to grasp the cartridge 63 without damaging it. Next, the control circuitry activates the carriage motor 138 to retract the carriage assembly, and thus the jaws 144a and 144b and the grasped cartridge 63, through the port 54 into the cartridge through passageway within the picker 36. At the same time, the control circuitry activates the roller motor 174 at a speed such that the speed of the rollers 172a and 172b matches that of the retracting carriage assembly. When the carriage assembly reaches a certain position, as indicated by the sensor array 184, such that the cartridge 63 has entered through the port 54 a sufficient distance to contact the tangent point of the roller 172a, the control circuitry deactivates the carriage drive motor 138 and opens the jaws 144a and 144b to release the cartridge 63. Next, the control circuitry increases the speed of the roller motor 174 such that the roller 172a, and then both the rollers 172a and 172b, fully retract the cartridge 63 into the cartridge passageway of the picker 36. A result of this sequence is a fluid transition of the cartridge 63 between the jaw and carriage assemblies and the transport assembly. When the cartridge 63 is retracted into the cartridge passageway of the picker 36 a sufficient distance to interrupt or break the two beams generated by the respective sensors in notches 146a and 146b and holes 150a and 150b, the control circuitry deactivates the roller motor 174. The sensor notches 148a and 148b in the jaws 144a and 144b prevent the jaws from interrupting the beam generated by the sensors mounted in the notches 146a and 146b of the front frame plate 116.

Figure 8C:
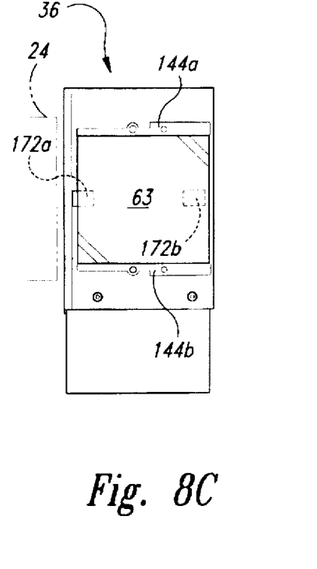

FIG. 8C shows the cartridge 63 fully retracted into the cartridge passageway of the picker 36 such that the cartridge 63 extends neither from the port 54 nor the port 56.

Figure 8D:
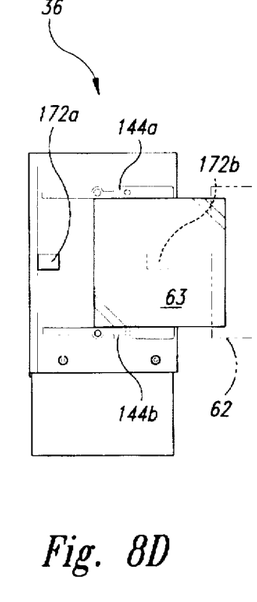

Referring to FIG. 8D, once the cartridge 63 is fully retracted into the cartridge passageway as shown in FIG. 8C, the control circuitry positions the picker 36 in the x-y plane such that its cell port 56 is aligned with the desired storage cell 62. The control circuitry then activates the roller motor 174 such that the rollers 172a and 172b move the cartridge 63 out through the port 56 and into the desired storage cell 62. At the same time, the control circuitry also activates the carriage motor 138 such that the carriage assembly moves the jaws 144a and 144b towards the port 54 as shown in FIG. 8F.

Figure 8E:
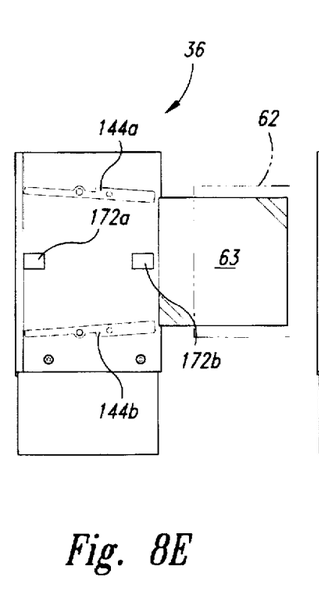

Referring to FIG. 8E, at a first time after the control circuitry activates the roller motor 174, the cartridge 63 moves beyond the tangent point of the rollers 172a and 172b. At this time, the cartridge is not fully inserted or loaded into the storage cell 62, and the rollers 172a and 172b can move the cartridge 63 no farther into the storage cell 62. At a second time that may occur before, coincident with, or after the first time, the beam generated by the sensors in the holes 150a and 150b becomes unbroken or reestablished. When the control circuitry detects that this beam has been reestablished, it activates the jaw motor 170 to close the ends of the jaws 144a and 144b that are adjacent to the port 56 of the picker 36.

Figure 8F:
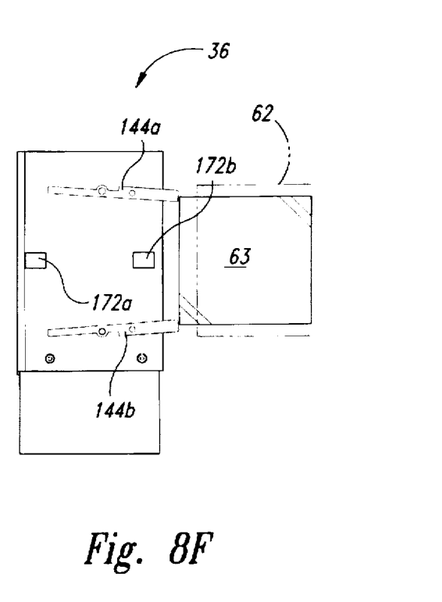

Referring to FIG. 8F, when the jaws 144a and 144b are closed as detected by the sensor array 192, the control circuitry activates the carriage motor 138 to move the jaws toward and through the port 56. The spring-loaded contact clips 156a and 156b of the jaws 144a and 144b contact the end of the cartridge 63, and the jaws perform a "final push," i.e., the jaws push the cartridge 63 the remaining distance into the desired storage cell 62. Again, the control circuitry monitors the sensor array 184 to determine when to deactivate the carriage motor 138 so as not to damage the cartridge 63.

The control circuitry again activates the carriage motor 138 to retract the jaws 144a and 144b into the picker 36 such that they extend neither from the port 54 nor the port 56. The picker 36 may now be moved to another position to handle another cartridge.

As stated above, the picker 36 can also transfer cartridges 63 between any two locations including the mailbox slots 24, the storage cells 62, and the drives 64. The techniques used are similar to that described above for transfer between a mailbox slot 24 and a storage cell 62, and for brevity will not be further explained herein.

Figure 9A:
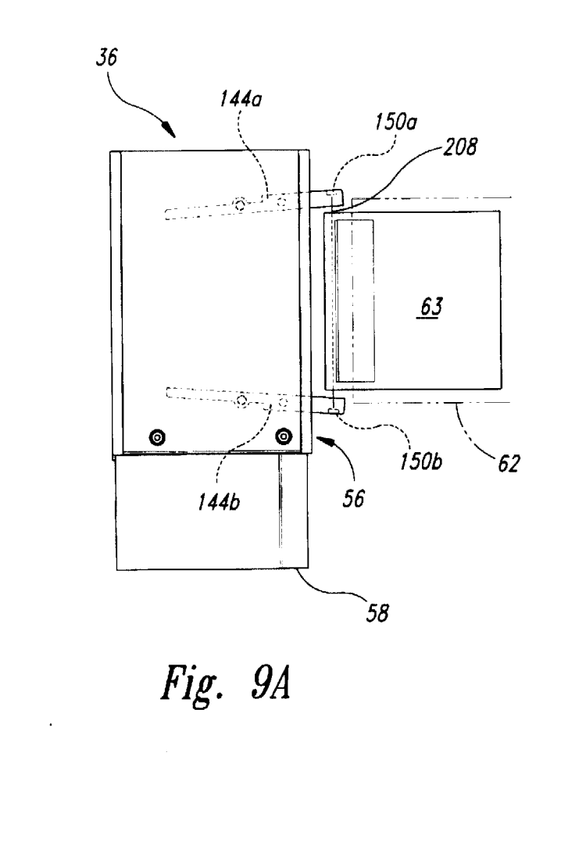
FIGS. 9A and 9B illustrate an inventory procedure used with cartridges stored in the storage cells of FIG. 2.
Figure 9B:
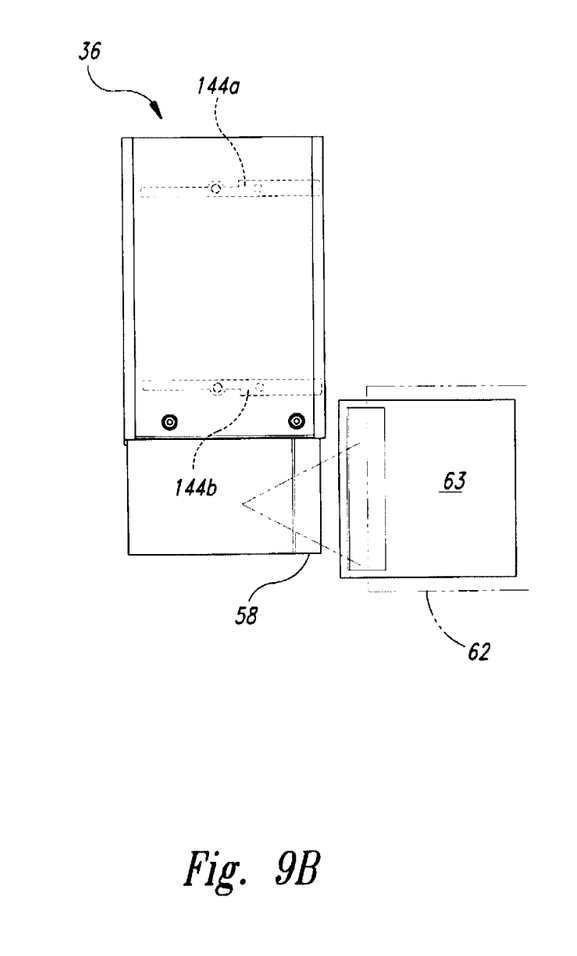

FIGS. 9A and 9B illustrate an inventory procedure that the library 12 typically performs at power up after the operator has manually accessed the mailbox 20, the storage cells 62, or the drives 64, or at the operator's request via the control circuitry. Referring to FIG. 9A, the control circuitry opens the ends of jaws 144a and 144b that are adjacent to the port 56 of the picker 36. As described above, the sensors mounted in the holes 150a and 150b generate a beam 208 here shown as between the open ends of the jaws 144a and 144b. Next, the control circuitry activates the x-y drive 38 to move the picker 36 to the beginning of a row of storage cells 62. The control circuitry then moves the picker 36 past the entire row of storage cells 62. If a cartridge 63 is present in a particular one of the cells 62, the beam 208 becomes broken, thus indicating to the control circuitry the presence of one of the cartridges 63 in that cell. The control circuitry maintains a record as to whether or not each storage cell 62 is detected as containing a cartridge 63.

Referring to FIG. 9B, after the picker 36 has scanned an entire row of storage cells 62 for the presence of cartridges 63, the control circuitry moves the picker 36 to align the bar-code reader assembly 58 with the vertical position of the labels 86 on the cartridges in a selected row of the storage cells 62. Next, the control circuitry moves the picker 36 to each storage cell 62 in the row that contains a cartridge 63. As the picker 36 passes each cartridge 63, the bar-code reader assembly 58 reads the bar code 86 attached to the cartridge 63. As stated above, the bar code 86 on each cartridge 63 includes identification data unique to that cartridge. The control circuitry stores this identification data and correlates it with an identification of the storage cell 62 in which the particular cartridge 63 is stored. The control circuitry then performs this inventory procedure for the remaining rows of storage cells 62. Thus, the control circuitry can develop and maintain an inventory of all of the cartridges 63 that are stored in the storage cells 62 of the library 12.

By using sensors (not shown) that are built into the drives 64, the control circuitry can also determine whether or not a cartridge 63 is in one of the drives 64, and instruct the drive to read the cartridge 63 identification data, which in addition to being stored on the label 86, is also stored on the DLT in computer-readable form. As stated above in conjunction with FIG. 6, the control circuitry uses the sensor array 106 to determine the presence of the cartridges 63 in the mailbox slots 24. To read the bar code on these cartridges 63, however, the control circuitry must first remove the cartridges 63 from the mailbox 20 and load them into empty storage cells 62. In such fashion, the control circuitry can also make a full inventory of the cartridges 63 that are present in the mailbox slots 24 and the media drives 64.

From the foregoing it will be appreciated that, although specific embodiments of the invention have been described herein for purposes of illustration, various modifications may be made without deviating from the spirit and scope of the invention. Accordingly, the invention is not limited except as by the appended claims. For example, the picker 36, the mailbox slots 24, the storage cells 62, and the media drives 64 can be adapted or altered to accept storage media other than the DLT cartridges 63. For example, the library 12 can be modified to store floppy disks, CD-ROMs, tape cassettes, or other forms of media.

We claim:

1. A library for storing a cartridge of data-storage media, comprising:

a chassis having first and second walls, said first wall spaced apart from and substantially parallel to said second wall;

a plurality of cartridge storage cells arranged in rows and mounted inside said chassis to said second wall, each of said cells having a cell opening that faces said first wall;

a cartridge mailbox mounted within an opening in said first wall and having a slot with a first slot opening that faces inside said chassis and toward said second wall and a second slot opening that faces outside said chassis and away from said second wall, said slot constructed to allow insertion of said cartridge into said slot via said first and said second slot openings and to allow removal of said cartridge from said slot via said first and said second slot openings;

an x-y drive assembly mounted within said chassis between said first and second walls and operable to move in a plane that is substantially parallel to said first and second walls;

a cartridge picker mounted to said drive assembly and having a jaw assembly, a first picker port, and a second picker port, said picker operable to retrieve said cartridge from and provide said cartridge to said mailbox slot via said first slot opening and said first picker port, said picker operable to retrieve said cartridge from and provide said cartridge to a desired one of said storage cells via said cell opening of said desired storage cell and said second picker port, said cartridge picker operable to extend said jaw assembly out from said first picker port, said extended jaw assembly operable to grasp said cartridge while said cartridge is in said mailbox slot, and said cartridge picker operable to retract said jaw assembly and said grasped cartridge in through said first picker port, said cartridge picker also operable to extend said jaw assembly and grasped cartridge out from said second picker port such that said extended jaw assembly inserts said cartridge into said storage cell, said cartridge picker is operable to move said cartridge out from said first or second picker port and partway into said mailbox slot or storage cell, respectively, and then to push said cartridge a remaining way into said mailbox slot or storage cell by extending said jaw assembly out from said first or second picker port, respectively, wherein said jaw assembly is operable to assume a closed position before said cartridge picker extends said jaw assembly to push said cartridge, whereby bidirectional movement of said grasped cartridge between said second picker port and said first picker port, through said cartridge picker, occurs in a single plane relative to said second picker port and said first picker port.

2. The library of claim 1 wherein said mailbox comprises a check lever assembly mounted within said slot and selectively movable between a first position in which said check lever prevents removal of said cartridge from said slot through said first slot opening and a second position in which said check lever allows removal of said cartridge from said slot through said first slot opening.

3. The library of claim 2 wherein said mailbox further comprises:
a mailbox door, which when in a closed position, prevents access to said second slot opening; and
a lock assembly operable to lock said mailbox door in said closed position and to lock said check lever assembly in said second position when said picker is removing or providing said cartridge.

4. The library of claim 1 wherein said cartridge picker is also operable to extend said jaw assembly out from said second picker port, said extended jaw assembly operable to grasp said cartridge while said cartridge is in said storage cell, and said cartridge picker operable to retract said jaw assembly and said grasped cartridge in through said second picker port, said cartridge picker also operable to extend said jaw assembly and grasped cartridge out from said first picker port such that said extended jaw assembly inserts said cartridge into said mailbox slot.

5. A library for storing a cartridge of data-storage media, comprising:
an enclosure having a door movable between closed and opened positions;
a plurality of cartridge storage receptacles mounted within said enclosure in a generally planar arrangement, each having a receptacle opening facing toward said door when in said closed position;
a cartridge mailbox mounted within an opening in said door and having a slot with a first slot opening accessible from within said enclosure and a second slot opening accessible from an outside of said enclosure, said slot constructed to allow insertion of said cartridge into said slot via said first and said second slot openings and to allow removal of said cartridge from said slot via said first and said second slot openings;
an x-y drive assembly mounted within said enclosure for movement in a generally planar range of movement with said planar range being generally parallel to said generally planar arrangement of said cartridges and between said cartridges and said mailbox; and
a cartridge picker mounted to said x-y drive assembly for movement therewith and having a first picker port and a second picker port, said picker being operable to receive said cartridge from and provide said cartridge to said mailbox slot via said first slot opening and said first picker port, said picker being operable to receive said cartridge from and provide said cartridge to a selected one of said storage receptacles via said receptacle opening and said second picker port, said cartridge picker including,
a frame positioned between said first and second picker ports;
a carriage assembly movably mounted to said frame and forming a cartridge passageway between said first and second picker ports;
a cartridge transport assembly mounted to said frame and operable to engage and move said cartridge along said cartridge passageway between said first and second picker ports; and
a jaw assembly mounted to said carriage assembly for movement therewith between said first and second picker ports, said jaw assembly operable to selectively grasp and release said cartridge, said carriage assembly operable to move said jaw assembly out through said first picker port said moved jaw assembly operable to grasp said cartridge when said cartridge is in said mailbox slot, and, after being moved by said carriage assembly in through said first picker port and into said cartridge passageway, said carriage assembly also operable to move said jaw assembly and grasped cartridge out through said second picker port to place said cartridge in said selected storage receptacle, said cartridge picker is operable to move said cartridge out from said first or second picker port and partway into said mailbox slot or storage receptacle, respectively, and then to push said cartridge a remaining way into said mailbox slot or storage receptacle by extending said jaw assembly out from said first or second picker port, respectively, wherein said jaw assembly is operable to assume a closed position before said cartridge picker extends said jaw assembly to push said cartridge, whereby bidirectional movement of said grasped cartridge between said second picker port and said first picker port, through said cartridge picker, occurs in a single plane relative to said second picker port and said first picker port.

6. The library of claim 5, further comprising:
a media drive mounted within said enclosure; and
wherein said picker is operable to receive said cartridge from and provide said cartridge to said drive via said second picker port.

7. The library of claim 5 wherein said mailbox comprises:
a mailbox door, which when in a closed position, prevents access to said second mailbox slot opening; and
a lock assembly operable to lock said mailbox door in said closed position when said picker is receiving or providing said cartridge.

8. The library of claim 5 wherein said mailbox further comprises a control panel and a display that allow an operator to select and run diagnostic software routines for said library.

9. The library of claim 5 wherein said carriage assembly is also operable to move said jaw assembly out through said second picker port, said moved jaw assembly operable to grasp said cartridge when said cartridge is in said selected storage receptacle, and, after being moved by said carriage assembly in through said second picker port and into said cartridge passageway, said carriage assembly also operable to move said jaw assembly and grasped cartridge out through said first picker port to place said cartridge in said mailbox slot.

10. A library for storing a plurality of cartridges of data-storage media, comprising:

an enclosure having an interior and a door that allows access to said enclosure interior, said door having a mounting port formed therein;

a plurality of cartridge storage cells arranged in a plurality of aligned rows and mounted within said enclosure interior, each of said cells having a cell opening that faces toward said door;

a media drive mounted adjacent to said cells and having a drive port that faces toward said door;

a cartridge mailbox mounted within said mounting port and having a plurality of slots arranged in a magazine, each of said slots having a first slot opening that opens inward of said enclosure and having a second slot opening that opens outward of said enclosure, each of said slots being constructed to allow insertion of one of said cartridges into said slot via said first and said second slot openings and to allow removal of said one of said cartridges from said slot via said first and said second slot openings, said mailbox including a mailbox cover mounted to said mailbox on an outer side of said door and including a locking device operable to lock said cover in a closed position;

an x-y drive assembly mounted within said enclosure for planar movement in a plane generally parallel to said cells and between said cells and said mailbox; and a cartridge picker mounted to said drive assembly for movement therewith and having a pair of jaws, a first picker port that faces toward said first slot openings of said slots when said door is closed, and a second picker port that faces toward said cells, said picker being operable to receive one of said cartridges from and provide one of said cartridges to each of said mailbox slots via said first slot opening and said first picker port, said picker being operable to receive one of said cartridges from and provide one of said cartridges to each of said cells via said cell opening and said second picker port, and said picker being operable to receive one of said cartridges from and provide one of said cartridges to said media drive via said second picker port, said cartridge picker operable to protrude said jaws out from said first picker port, said protruded jaws operable to grasp said cartridge while said cartridge is in a mailbox slot, and said cartridge picker operable to retract said jaws and said grasped cartridge in through said first picker port, said cartridge picker operable to protrude said jaws and grasped cartridge out from said second picker port such that said protruded jaws put said cartridge into a cell or said media drive, said cartridge picker is operable to move said cartridge out from said first or second picker port and partway into said mailbox slot, or into said cell or said media drive, respectively, and then to extend said jaws out from said first or second picker port so as to push said cartridge a remaining way into said mailbox slot, or into said cell or media drive, respectively, with said jaws, wherein said cartridge picker is operable to close said jaws before said cartridge picker extends said jaws to push said cartridge, whereby bidirectional movement of said grasped cartridge between said second picker port and said first picker port, through said cartridge picker, occurs in a single plane relative to said second picker port and said first picker port.

11. The library of claim 10 wherein operation of said picker is inhibited when said locking device is locking said cover in said closed position.

12. The library of claim 10 wherein said magazine includes a plurality of said slots arranged in a first magazine and a plurality of said slots arranged in a second magazine adjacent to said first magazine.

13. The library of claim 12 wherein:

said slots of said first magazine allows said cartridges to be imported into said library; and said slots of said second magazine allows said cartridges to be exported from said library.

14. The library of claim 10 wherein said magazine is selectively removable by an operator.

15. The library of claim 10, further comprising:

circuitry coupled to and operable to control said locking device, said x-y drive assembly, and said picker; and wherein said x-y drive assembly further comprises,
a guide rod, and
a cable that is coiled around said guide rod and that electrically couples said picker to said circuitry.

16. The library of claim 10 for use with cartridges having bar codes located thereon, wherein said picker further comprises a scanner that is operable to read said bar codes on said cartridges.

17. The library of claim 10 wherein said cartridge picker is also operable to protrude said jaws out from said second picker port, said protruded jaws operable to grasp said cartridge while said cartridge is in a cell or said media drive, and said cartridge picker operable to retract said jaws and said grasped cartridge in through said second picker port, said cartridge picker operable to protrude said jaws and grasped cartridge out from said first picker port such that said protruded jaws put said cartridge into a mailbox slot.

* * * * *